United States Patent
Weiss et al.

(10) Patent No.: US 12,105,857 B2
(45) Date of Patent: Oct. 1, 2024

(54) SYSTEM AND METHOD FOR DETECTION OF COUNTERFEIT AND CYBER ELECTRONIC COMPONENTS

(71) Applicant: CYBORD LTD., Tel Aviv (IL)

(72) Inventors: Eyal Isachar Weiss, Bnei Reem (IL); Zeev Efrat, Ramat-Hasharon (IL); Gil Shimon Givati, Bnei Reem (IL)

(73) Assignee: CYBORD LTD, Tel Aviv (IL)

( * ) Notice: Subject to any disclaimer, the term of this patent is extended or adjusted under 35 U.S.C. 154(b) by 408 days.

(21) Appl. No.: 17/599,603

(22) PCT Filed: Apr. 1, 2020

(86) PCT No.: PCT/IL2020/050397
§ 371 (c)(1),
(2) Date: Sep. 29, 2021

(87) PCT Pub. No.: WO2020/202154
PCT Pub. Date: Oct. 8, 2020

(65) Prior Publication Data
US 2022/0164483 A1 May 26, 2022

Related U.S. Application Data

(60) Provisional application No. 62/828,221, filed on Apr. 2, 2019.

(51) Int. Cl.
*H04L 29/06* (2006.01)
*G01R 31/28* (2006.01)
(Continued)

(52) U.S. Cl.
CPC ......... *G06F 21/73* (2013.01); *G01R 31/2853* (2013.01); *G01R 31/2894* (2013.01); *G06F 21/44* (2013.01); *G06N 20/00* (2019.01)

(58) Field of Classification Search
CPC ..... G06F 21/73; G06F 21/44; G01R 31/2853; G01R 31/2894; G06N 20/00
See application file for complete search history.

(56) References Cited

U.S. PATENT DOCUMENTS 5,751,910 A 5/1998 Byrant et al.
6,023,663 A 2/2000 Kim
(Continued)

FOREIGN PATENT DOCUMENTS

CN 108665072 A * 10/2018
EP 1212606 B1 6/2022
(Continued)

OTHER PUBLICATIONS

Supplemental Search Report dated Nov. 25, 2022 for Corresponding European application 20782042.4 filed Apr. 1, 2020.
(Continued)

*Primary Examiner* — Shawnchoy Rahman
(74) *Attorney, Agent, or Firm* — A.C. Entis-IP Ltd; Allan C. Entis

(57) ABSTRACT

Embodiments of the present invention may include a method and a system for detection of counterfeit and cyber electronic components by obtaining one or more features from a plurality of electronic components of a first type and from a plurality of N electronic components of a second type, processing the one or more features to create a unique model related to an electronic component of the first type and to an electronic component of the second type, examining a detected electronic component by obtaining one or more features of the detected electronic component, executing the unique model with the one or more features of the detected electronic component and determining if the detected electronic component is an authentic electronic component of the first type or the second type.

19 Claims, 11 Drawing Sheets

(51) Int. Cl.
*G06F 21/44* (2013.01)
*G06F 21/73* (2013.01)
*G06N 20/00* (2019.01)

(56) References Cited

U.S. PATENT DOCUMENTS

| | | |
|---|---|---|
| 2004/0143352 A1 | 7/2004 | Gyorfi et al. |
| 2006/0173654 A1 | 8/2006 | Apps et al. |
| 2007/0223685 A1* | 9/2007 | Boubion ............... G06F 21/32 380/2 |
| 2013/0284803 A1 | 10/2013 | Wood et al. |
| 2015/0078518 A1 | 3/2015 | Tziazas et al. |
| 2015/0161024 A1* | 6/2015 | Gupta .................. G06N 5/043 714/47.3 |
| 2016/0088264 A1* | 3/2016 | Freeze ................. H04N 23/51 348/363 |
| 2016/0282394 A1 | 9/2016 | House et al. |
| 2017/0032285 A1 | 2/2017 | Sharma et al. |
| 2017/0330201 A1 | 11/2017 | Shaapur et al. |
| 2018/0031449 A1 | 2/2018 | Cloake |
| 2020/0082546 A1 | 3/2020 | Cui et al. |
| 2020/0364817 A1 | 11/2020 | Liu et al. |

FOREIGN PATENT DOCUMENTS

| | | | |
|---|---|---|---|
| KR | 101993705 B1 | 6/2019 | |
| WO | WO-2013116256 A1 * | 8/2013 | ........... G06K 9/2027 |
| WO | 2015157526 | 10/2015 | |
| WO | WO-2017201489 A1 * | 11/2017 | ............. B22F 10/20 |
| WO | 2020011447 | 1/2020 | |
| WO | 2020048119 | 3/2020 | |
| WO | 2021250679 | 12/2021 | |

OTHER PUBLICATIONS

International Search Report dated Aug. 25, 2021 for International application PCT2021050708 filed Jun. 10, 2021.
International Search Report for PCT Application No. PCT/IL2020/050397 mailed on Jul. 29, 2020.
International Search Report dated Aug. 17, 2023 International application PCT/IL2023/050458 filed May 4, 2023.
European Extended Search Report dated Apr. 11, 2024 for European application 21785725.9 filed Oct. 31, 2022.
International Written Opinion dated Jul. 15, 2021 for International application PCT/IL2021/050409 filed Apr. 8, 2021.
International Search Report dated August Jul. 29, 2020 International application PCT/IL2020/050397 filed Apr. 1, 2020.
Daniel Singer. This AI Startup Keeps Counterfeit Components Out of Your Gadgets [retrived 1-27 on Nov. 13, 2019]. retrived from <https://www.startuphub.ai/this-ai-startup-keeps-counterfeit-components-out-of-your-gadgets> Daniel Singer, Nov. 19, 2019 (Nov. 13, 2019).
Ning San Chang, SMV—A Computer Vision Program for Loading Surface Mount Components, vol. 0557, Dec. 19, 1985, pp. 1-6.
Supplementary Search Report for European Application No. 21821205.8, filed Jan. 13, 2023.

* cited by examiner

SYSTEM AND METHOD FOR DETECTION OF COUNTERFEIT AND CYBER ELECTRONIC COMPONENTS

CROSS-REFERENCE TO RELATED APPLICATIONS

This application is a U.S. National Phase Application of PCT International Patent Application No. PCT/IL2020/050397 International Filing Date Apr. 1, 2020, claiming the benefit of U.S. Provisional Patent Application No. 62/828,221, filed Apr. 2, 2019, which is hereby incorporated by reference.

BACKGROUND OF THE INVENTION

Counterfeit electronic components pose a significant threat to the electronics industry. Counterfeit components can be anything from recycled, post-dated, rejected, fake, blacktopped, hardware cyber, or any non-authentic component. Counterfeiting of electronic components is very sophisticated and pose a major challenge to the entire electronic industry when sold or bought as authentic. The potential of losses associated with buying or selling counterfeit electronic components could reach millions of dollars caused by loss of reputation, reworks, lawsuits, failures, loss of functionality or cyber penetration.

Conventional mitigation methods attempting to avoid counterfeit electronic components may include controlling the supply chain using management tools that allow buying only from trusted and approved distributers or from the component's manufacturers directly.

Current solutions for detection of counterfeit electronic components utilizes either simple and manual inspection tools, like a magnifying glass, stereoscope or post assembly inspection tools like X-ray, CT, AOI, etc., This inspection type is slow, mostly manual and ineffective against sophisticated counterfeits. Furthermore, the inspection is done on samples of components which do not guarantee evading counterfeit components as counterfeiters often mix authentic and fake components in the same reel packaging to avoid detection.

It is an object of the present application to provide an automated system for mass authentication of up to 100% of articles such as electronic components before they are assembled.

Component solderability is another problem in the electronics industry which, may result in excessive board joint rework and system failures. The evaluation process is performed by visual examination of the solder coverage on the leads after the solder dip process. Common inspection methods are manual, labor-intensive, expensive and performed on samples. It is another object of the present application to provide a solderability test which are performed automatically and efficiently on all assembled components during assembly.

SUMMARY OF THE INVENTION

Embodiments of the invention allow testing of electrical components. The authentication methods according to embodiments of the invention are non-destructive and may take place while inside different components shipment and handling package types like reels at different dimensions and pitch, stick magazines, bulk and trays. The authentication may take place on bare components and by adding the algorithm to other systems.

Embodiments of the invention may allow evaluating the state of the components soldering pads. This feature may be used both as a mean to detect pads reworking as an indication of counterfeiting and to evaluate the quality of the pads for solderability. The presented method is not destructive, and it may enable mass solderability estimation on all components before they are used.

Embodiments of the present invention may include a method and a system for detection of counterfeit and cyber electronic components by obtaining one or more features from a plurality of electronic components of a first type and from a plurality of electronic components of a second type, processing the one or more features to create a unique model related to an electronic component of the first type and to an electronic component of the second type, examining a detected electronic component by obtaining one or more features of the detected electronic component, executing the unique model with the one or more features of the detected electronic component and determining if the detected electronic component is an authentic electronic component of the first type or the second type.

According to embodiments of the invention, one or more features are one or more physical features and obtaining one or more features may include collecting one or more measurements by one or more measurement probes.

According to embodiments of the invention, processing the one or more physical features comprises running one or more algorithms on the one or more features and training the unique model by running one or more Machine Learning algorithms and Deep Learning algorithms.

According to embodiments of the invention, the one or more features may be obtained while the electronic components are automatically conveyed in a manner that allows high throughput while tracking every individual component feature by one or more measurement probes. The one or more features may be obtained by one or more systems from a group consisting of: a computer vision system, an Infra-Red (IR) Spectroscopy system, an emissivity measurement system, an electromagnetic Radio Frequency (RF) system, a X-ray measurement system.

According to embodiments of the invention, the one or more features may be obtained by capturing one or more images of electronic components. The one or more images may include logistical information. Some embodiments of the invention may include automatically removing a cover tape that covers the electronic components, prior to capturing the one or more images.

According to embodiments of the invention, obtaining one or more features may include one or more of the following measurements: infrared spectrum of absorption or emission materials, emissivity measurement, electromagnetic Radio Frequency (RF) measurement, and X-ray measurement.

According to embodiments of the invention, the method may further include compiling quality related outputs to a quality index determining whether the component can be used in production, the quality index may compile the algorithms output for authentic components and may classify components with different types of faults.

Embodiments of the invention may include detecting one or more faults of the electronic component, the faults may be selected from the group consisting of: cracks, voids, missing legs, tampering, corrosion and solderability issues.

Embodiments of the invention may include evaluating the state of the components soldering pads, thereby enabling to detect pads reworking as an indication of counterfeiting and to evaluate the quality of the pads for solderability.

Embodiments of the invention may include processing the one or more features to create a unique model related to an identification of a machine that packages the plurality of electronic components of the first type and from a plurality of electronic components of the second type.

According to embodiments of the invention, the one or more features are related to a process of component packaging of the plurality of electronic components of the first type and to a process of component packaging of the plurality of electronic components of the second type, to reduce a number of detected electronic components.

Embodiments of the present invention may include a system for detection of counterfeit and cyber electronic components. The system may include one or more measurement probes for obtaining one or more features from a plurality of electronic components of a first type and from a plurality of electronic components of a second type and a data processing unit configured to process the one or more features to create a unique model related to an electronic component of the first type and to an electronic component of the second type, executing the unique model with one or more features obtained from a detected electronic component and to determine if the detected electronic component is an authentic electronic component of the first type or the second type.

According to embodiments of the invention, one of the measurement probes may be a probe of a computer vision system adapted to capture images of the electronic components and to apply automated image processing tools on the captured images.

According to embodiments of the invention, the data processing unit is further configured to train one or more Machine Learning algorithms and Deep Learning algorithms and to process and train the data online or upload the processed data to a cloud processing server.

According to embodiments of the invention, the system may further comprise a conveying sub-system adapted to convey the electronic components in their original package for their measurements by the one or more measurement probes. The conveying sub-system may be configured to remove a cover tape of the electronic components package prior to obtaining the measurements.

Embodiments of the invention may include a system for detection of counterfeit and cyber electronic components including instructions which when executed by at least one processor causes the processor to perform the method, thereby enabling the components to be tested separately by using images or measurements made by different systems.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
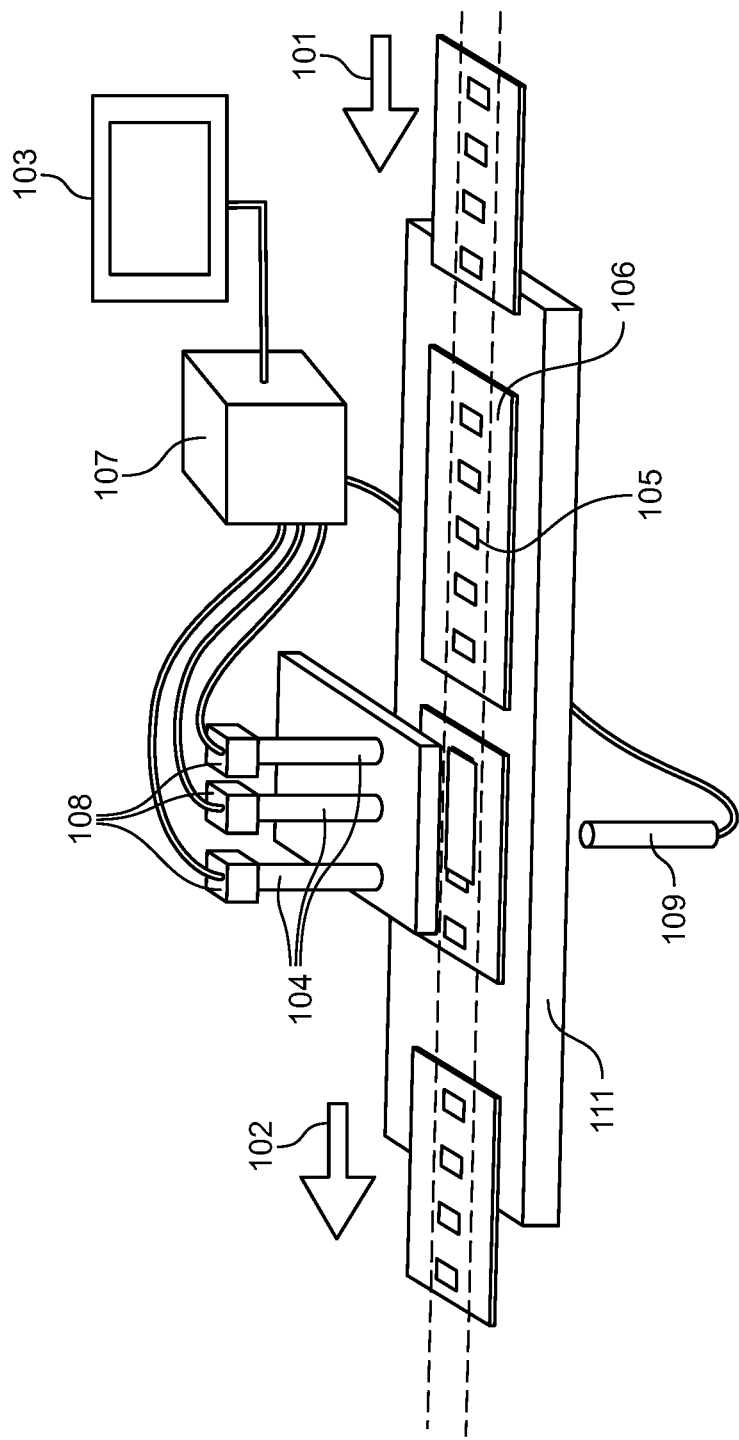
FIG. 1 is a schematic illustration of an exemplary system for detection of counterfeit and cyber electronic components according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

The terms "features", "characteristics" and "fingerprint" may be used herein to refer generally to data, pattern, information, specific design, mark, image, physical attribute, chemical, optical attribute or any combination thereof, which may be used to uniquely identify, model or classify a component, an item or an element.

The term "server" may be used herein to refer to a computer or a computer program, that may be accessible over a communications medium, such as a communications network or other computer network, including the Internet and may provide services to, or performs functions for, other computers, computer programs and/or their users.

According to an embodiment of the invention, an authentication process may be performed by obtaining a set of physical features of components and processing them using machine learning classification algorithm abstraction. Embodiments of the present invention utilizes computer algorithm such as, machine learning algorithm and/or artificial intelligence-based algorithms to analyze, process and compile measured features of a plurality of component arriving from one or more measurements tools. A unique model based on a large number of detected components may be generated and may be used to classify a detected component in relation to a comprehensive components pre-acquired database and to determine if the detected electronic component is an authentic electronic component.

The figures and the following description relate to embodiments of the present invention by way of illustration only. It should be noted that from the following discussion, alternative embodiments of the structures and methods disclosed herein will be readily recognized as viable alternatives that may be employed without departing from the principles of the claimed invention. Moreover, these embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

According to an embodiment of the present invention, the inspection is performed by a system that mechanically and automatically conveys the electronic components in their original package, with or without discharging them across modular measurement probes. The system may contain several measurement sub-systems according to the required customization, the level of authenticity reliability, throughput, and the expected counterfeit type.

Reference is now made to FIG. 1, which is a schematic illustration of an exemplary system for detection of counterfeit and cyber electronic components according to some embodiments of the invention. System 100 may include a conveyor 111 for moving, shifting or transporting components 105 located in container 106 from a first end of system 100, e.g., input 101 to a second end of system 100, e.g., output 102 by a conveyor 111. For example, system 100 may include a reel-to reel mechanism or any other known in the art other mechanism, tool, process or way for moving, shifting or transporting components from a first end of system 100 to a second end of system 100 according to embodiments of the invention.

System 100 may include a control system 103, a data processing unit 107, one or more sub-systems 108 one or more upper measurement probes 104 and one or more lower measurement probes 109. Sub-system 108 may be connected, linked, attached, related and/or include one or more upper measurement probes 104 positioned above detected component 105 and one or more lower measurement probes 109 positioned below detected component 105. Sub-system 108 may include any system that may be used for detecting, inspecting, probing, testing and/or sensing an electronic component. Tolls or probes 104 and 109 may be used to probe, check, test or investigate a component or element while being moved from input 101 to output 102 of system 100. One or more measurements probes 104 and/or 109 may be installed according to the hardware customization, e.g., of control system 103 and the selected tiers.

According to an embodiment of the invention, sub-system 108 may include any system that may be used for detecting a component and for obtaining one or more features of a detected component based on one or more measurements from one or more probes 104 and 109. Data processing unit or module 107 may collect or receive the measurement output data and features from one or more sub-systems 108, may compile and process the collected measurement output data by running executing or processing one or more algorithms to create a unique model related to the electronic components. Control system 103 may be connected to data processing unit 107 and to each of subsystems 108 and may control, manage and monitor data processing unit 107 and to each of subsystems 108. Control system 103 may be located as an integral unit of system 100, or may be an external system, e.g., located in a remote location and connected via any communication network.

Electronic component 105 may be any component, part, piece, block or other form of element may be inspected or detected by system 100. Component 105 may be positioned on conveyor 111 while being moved from input 101 to output 102 of system 100. System 100 may detect any type of electronic component 105 and/or electronic component 105 that are manufactured by a plurality of manufacturers, makers or companies. According to some embodiments of the present invention, in cases where a packaging of component 105 comprises a cover from any type that may cover the components, e.g., a cover tape, this cover may be removed prior to detection, inspection or probing, e.g., before capturing the component image, and may be replaced thereafter. Removing the cover of component 105 may allow direct contact with one or more probes 104, 109 and better visibility, and upon completion of inspection the cover may be replaced automatically. According to embodiments of the invention, conveyor or conveying system 111 may convey the electronic components in their original package, for their measurements and detection.

According to embodiments of the invention, a component, e.g., component 105 may include a cover, a package, a pack or a wrap which may include logistical information. The logistical information may be included in or on a cover of component 105, for example, it may appear in a digital format and on a sticker placed on a reel i.e., a packaging form in which the components are usually placed in specifically designed pockets embossed in a plastic carrier tape.

Figure 2:
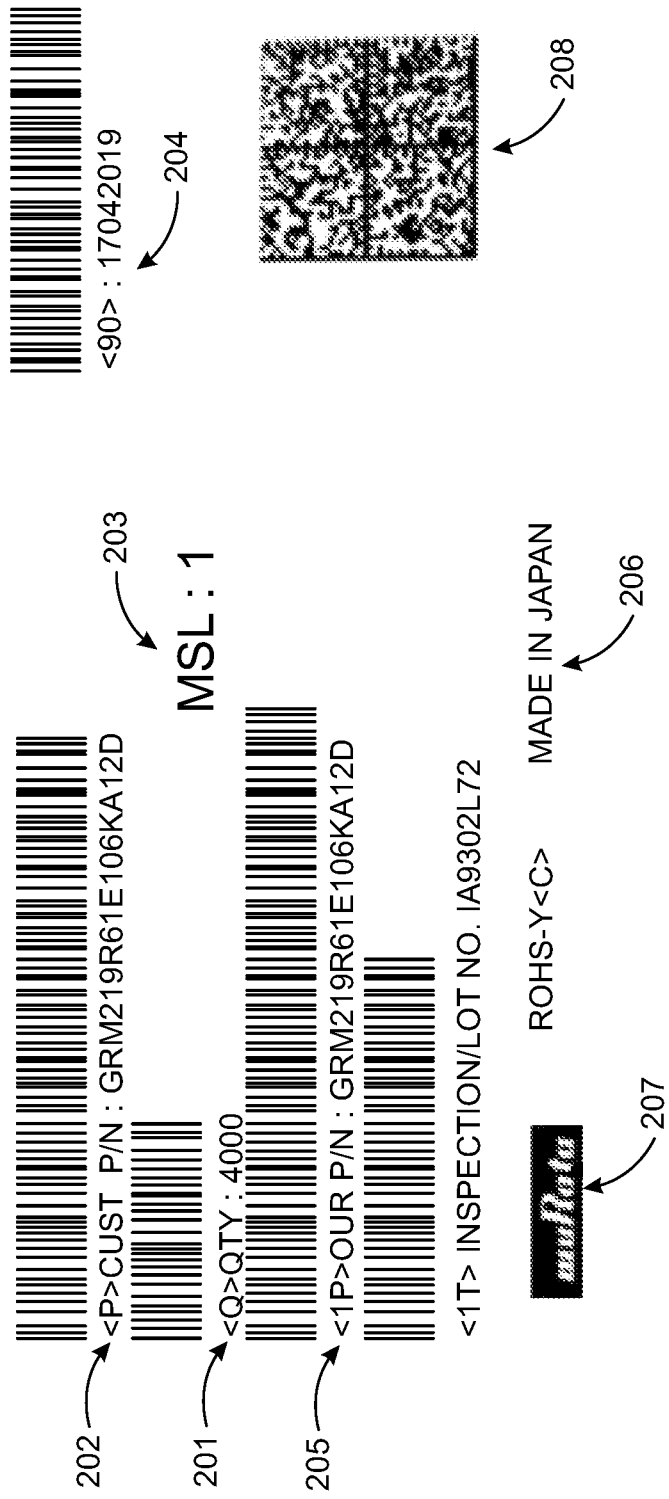
FIG. 2 is a schematic illustration of an exemplary sticker with logistical information of electrical components according to some embodiments of the invention.

Reference is now made to FIG. 2, which is a schematic illustration of an exemplary sticker with logistical information of electrical components according to some embodiments of the invention. Sticker 200 may include logistical and other information which may include quantity of components in a container 201, a name or logo of a manufacturer of the component 207, an origin of a manufacturer of the component 206, distributer information 205, date of manufacturing 204, package storage requirements 203, manufacturer part number 202, barcode 208, other information such as expiration date, materials, manufacturing location, production codes and other information may be included in sticker 200.

According to embodiments of the invention, capturing, acquiring, detecting and/or identifying information included in sticker 200 may be performed by, for example, sub-system 108 of FIG. 1 and this information may be used as a part of the counterfeit detection algorithm. For example, sticker 200 may be photographed, imaged or scanned, e.g., by using a camera, a scanner, an imager or other image detector. The received image may be analyzed by using machine-vision tools to decode the text and codes which are included in sticker 200. In addition, sticker 200 design, e.g., the size, the shape and the internal fields may be also be used as an input by itself, as the counterfeiters may have to forge this sticker and it therefore holds clues to the authenticity of the reel.

Figure 3A:
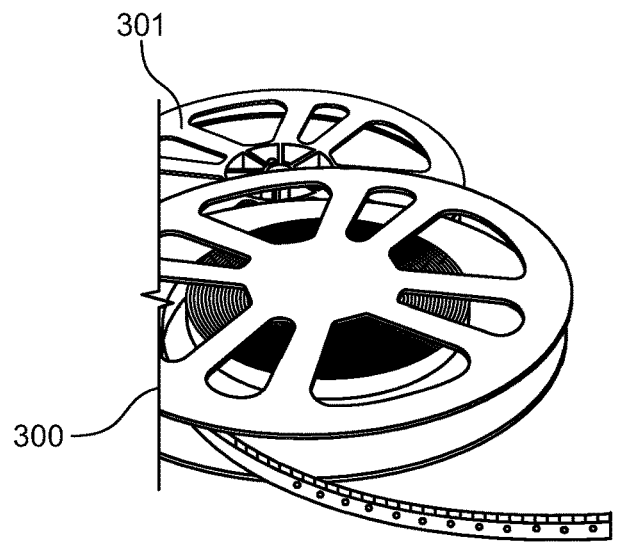
FIGS. 3A, 3B and 3C are schematic illustrations of exemplary forms of components packaging according to some embodiments of the invention.
Figure 3B:
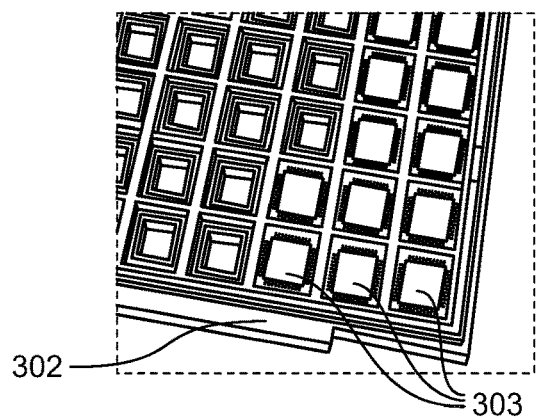
Figure 3C:
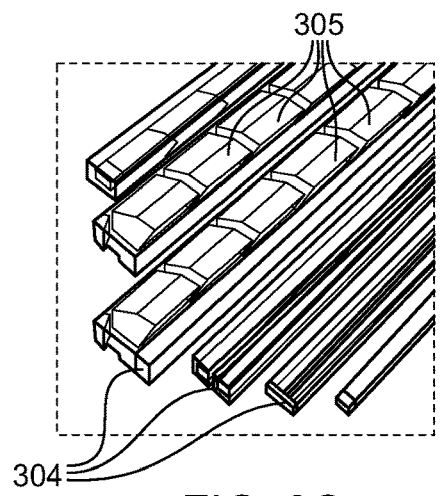

Reference is now made to FIGS. 3A, 3B and 3C which are schematic illustrations of exemplary forms of components packaging according to some embodiments of the invention. FIGS. 3A, 3B and 3C shows different types of exemplary components packages. FIG. 3A shows reels 300 and 301 which may be used, for example with system 100 of FIG. 1. FIG. 3B shows tray 302 which may include a plurality of components 303 and FIG. 3C shows a plurality of stick magazines 304, each stick magazine 304 may include a plurality of components 305.

According to embodiments of the invention, a conveying sub-system may be configured to gently remove a cover tape or another cover of the detected components, so the components are exposed to the measurement probe and to gently convey them along one or more probing stations of the system. In some embodiments, the cover, e.g., a cover tape may remain and may not be removed, and the measurements may be taken through it. Such an embodiment may allow faster measurement rate and better safety to the components at the cost of lower quality measurements. Some embodiments of the invention may include processes and/or algorithms which may operate on measurements obtained without a conveying system. In some embodiments of the invention a conveying system may be part of an existing system.

Some embodiments of the invention may include reels conveying, e.g., reels 300 and 301 of FIG. 3A. A conventional reel-to-reel system may be used, e.g. as system 100 of FIG. 1. A conventional reel-to-reel system is commonly used for components tapping, components counting and visual inspection. A reel-to-reel system may safely remove and replace the components cover tape without ejecting the components form their pockets. Some systems may be used for either loading trays, e.g., tray 302 of FIG. 3B and stick magazines, e.g., stick magazines 304 of FIG. 3C into tapes, e.g., of tapping machines or to convey trays for processing.

For example, existing component placement machines can pick and place thousands of components per hour with a very high degree of accuracy. To achieve this performance, the component delivery system must be capable of feeding parts at high speeds in a consistent orientation, positively indexed to the demands of the machine. The leads of the components must be protected from damage during shipment, handling, and placement.

One of the preferred packing materials for these demands is tape and reel. In embodiments which may include tape and reel format, the components may be placed in specifically designed pockets embossed in a plastic carrier tape. The cover tape may be attached to the carrier tape to keep the parts in place in these pockets. A row of pocket holes may be provided along one edge of the embossed tape to facilitate positive indexing. The tape may be then wound onto a rigid plastic reel that provides mechanical protection during handling and storage. Other conveying systems and other forms of components packaging and/or components assemblies may be used in embodiments of the invention.

An analysis may be performed based on probing or detection of any or both sides of component 105 or packaging 106 of component 105, such as the top side as well as utilizing a bottom side's hole to probe and/or position the component in a predetermined position. The analysis can be performed based on measurements taken from any direction (top, down or side) by other machines such as, for example, surface-mount technology (SMT) pick-and-place machine that takes pictures and measures the components during assembly, an x-ray counting machine imaging the reels from a side view or any other machine external to system 100.

Embodiments of the invention may provide the requirements for selections of the one or more hardware concepts, elements and one or more sub-systems that includes one or more in-line measurements tools, e.g., measurement probe 104 and/or probe 109. System 100 may be considered as "system of systems", multiple systems or subsystems 108, a combination of systems or subsystems 108 that may combine one or more technologies, tools, machinery that may utilize their capabilities to perform one or more physical, chemical, optical, statistical or any other measurements for detection of counterfeit electronic components. Sub-system 108 may include any system from a group consisting of the followings sub-systems: computer vision system, Infra-Red (IR) Spectroscopy system, Emissivity measurement system, Electromagnetic Radio Frequency (RF) measurement system and X-ray measurement system all which are described in further details hereinafter.

Computer vision systems. System 10 may include computer vision system as subsystem 108, e.g., in order to control production processes. Computer vision system 108 may comprise a camera with lens, light source and a processing unit. In some embodiments the camera, the light source and the processing unit are combined to a singular unit while in other embodiments they are standalone units. According to some embodiments, the camera may be for example, a three-dimensional (3D) camera, a digital camera or any other camera or imager. Camera lighting and lens are used to capture high quality images and the processing unit, e.g., processing unit 107 of FIG. 1, may be used to run automated image processing tools and algorithms on the captured image. Computer vision systems may be capable to detect faults in components, read text and codes, find anomalies, find edges and indentations etc. Faults may be one or more from the group consisting of, cracks, voids, missing legs, tampering, corrosion and solderability issues. In some embodiments, the vision system is used for some its inherent capabilities for anomaly and fault detection. In addition, the system outputs the enhanced images captured to the system's classification algorithm as an input. These may include positioning the image of the component, or of other parts of the component's image like leads, indentation and the like. The vision subsystem may extract features like dimensions, colors, angles from the captured image. The computer vision system may be a dedicated system or can be an existing on-shelf system.

Infrared spectroscopy. System 100 may include infrared spectroscopy techniques or systems as subsystem 108 to obtain an infrared (IR) spectrum of absorption or emission materials of a detected component. An IR spectrometer may measure data over a wide spectral range and may be used in embodiments of the invention. For example, it may measure how well a sample absorbs light at each wavelength. IR spectroscopy system may shine or emit a beam containing many wavelengths of light in the Mid-IR band at once and may measure how much of that beam is absorbed by the detected component or sample. The beam may be modified to contain a different combination of wavelengths. The absorption at each wavelength may be extracted from the measurement and may be used in the process of inspecting the component to detect counterfeit.

Embodiments of the invention may use IR analysis to identify materials, determine the quality or consistency of a sample and determine the number of components in a mixture. An infrared spectrum represents a fingerprint of a sample with absorption peaks which correspond to the frequencies of vibrations between the bonds of the atoms making up the material. Because each different material is a unique combination of atoms, no two compounds produce the exact same infrared spectrum. Therefore, infrared spectroscopy may be used in order to identify specific materials and may result in a positive identification of different kind of materials. In addition, the size of the peaks in the spectrum is a direct indication of the amount of material present. Software algorithms which are based on IR spectroscopy may be used in embodiments of the invention as a tool for quantitative analysis. IR beam interacts with the surface of the component. It cannot penetrate a cover tape if exists. In order to use IR light for detection of an object, the IR beam must reach the component surface itself. Embodiments which may use conventional reflective IR spectroscopy may operate relatively slow and, in some cases, may require direct contact with the measured object. Embodiments of the invention may preferably focus on non-contact fiber-based systems that may measure the reflectance. For example, fiber based Mid-IR band spectrometer may be used.

Emissivity measurement—System 100 may include emissivity measurement techniques or systems as subsystem 108. A surface of an electronic component is typically made of cast epoxy compound, metal or ceramic, text marking engraved or stamped, soldering pads and indentations. Each of these items and or materials may reflect light in a different way. As a result, the combination of all the items generates a unique emissivity spectral fingerprint for each electrical component. For example, if an original component is made of a cast epoxy its surface roughness may yield a specific spectral emissivity. When the same component is re-painted with epoxy paint, the surface roughness will be different, like brush strokes, and as a result, the surface emissivity will be different. Each part of the component, specifically of the top surface has different emissivity. For example, the emissivity coefficient of polymers is in the range of 0.9-0.97 and for typical paint is 0.88-0.98. For un-oxidized tin it is ~0.0.04, and for oxidized tin is 0.3-0.6.

Figure 4A:
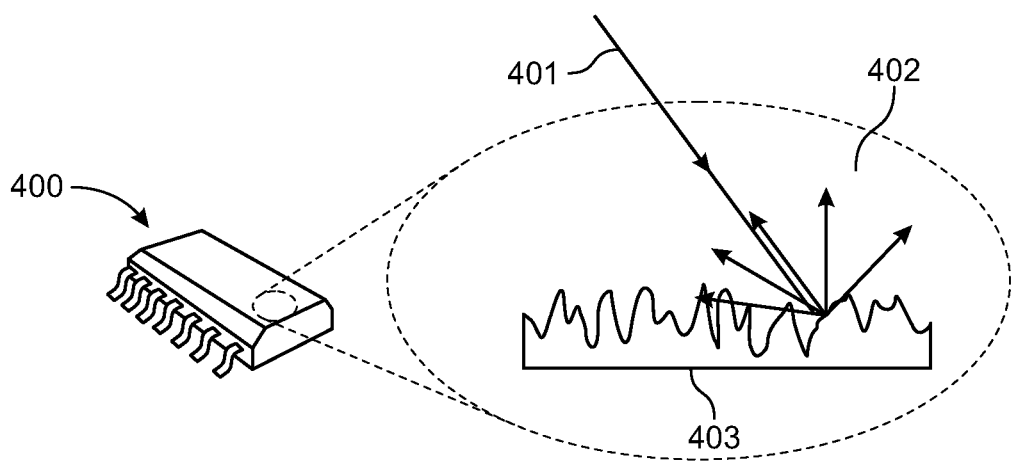
FIGS. 4A and 4B are schematic illustrations of spectral measurements of light reflection from a surface according to some embodiments of the invention.
Figure 4B:
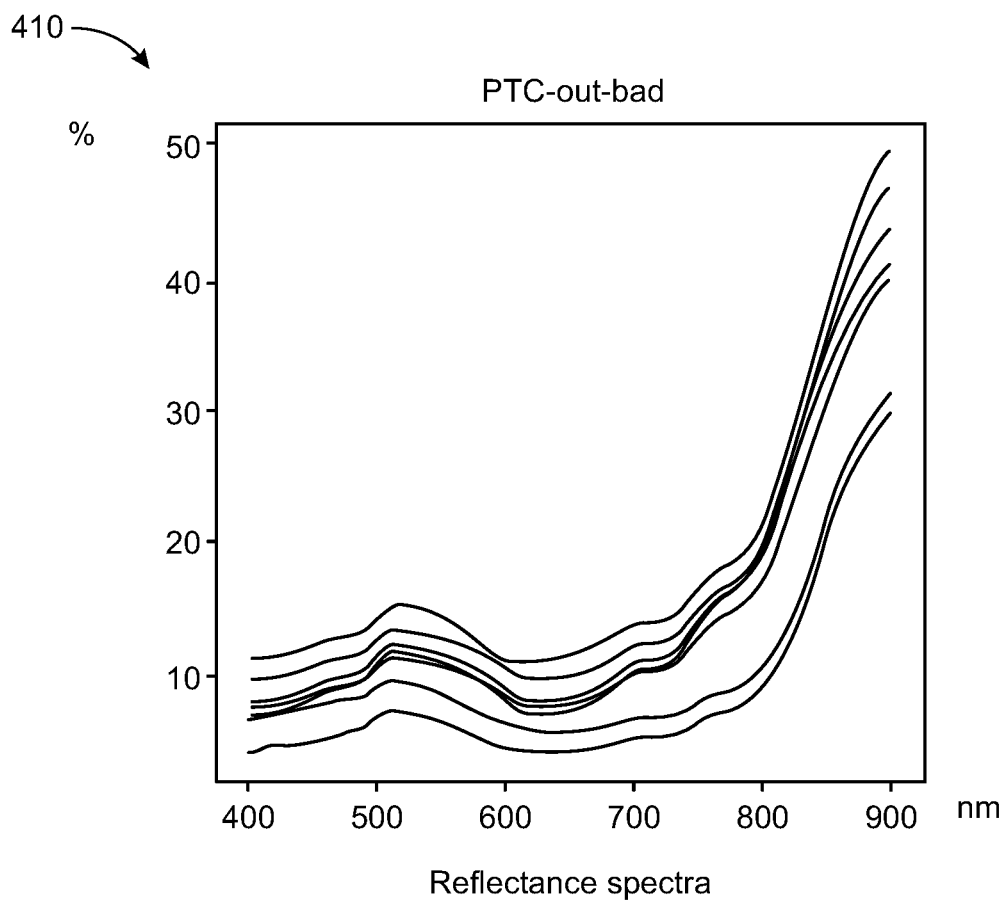

Reference is now made to FIGS. 4A and 4B, are schematic illustrations of spectral measurements of light reflection from a surface according to some embodiments of the invention. Embodiments of the invention may use subsystems 108 that measure the spectra of light reflection from a detected component, e.g., from a surface of a detected component. For example, the emissivity of the component surface is a strong indicator of black-topping because the roughness of the painted-over surface is significantly different than the original as-cast component package. The spectral reflectance measurement records the reflectance at all visible light spectrum thus obtaining a unique emissivity 'fingerprint". The emissivity of the soldering leads of the component has strong correlation with the amount of oxidation and inter-metallics in the leads. The lead oxidation is a degenerative process initializing at the leads casting and deteriorating in time and storage conditions. This means that the leads emissivity is a correlation to the "age" and "condition" of the soldering leads.

In some embodiments of the invention, a surface reflectance may be measured using Ultraviolet (UV)/Visible (VIS) spectroscopy. As shown in FIG. 4A, The measurement may performed by shining light beam 501 on a surface of a component or a sample 400 with wavelength band of ~200-1000 nm, which is typically smaller than the surface roughness grooves 403 in component 400. The reflected light 402 may be picked-up and analyzed using a spectrometer that may evaluate the reflectance in each wavelength and plots a spectrum. The measured spectrum is a superposition of the entire measured surface where the light shone. The environment contribution to the measurement may be removed by calibrating the measurement in-situ. An exemplary spectrum graph 410 is presented in FIG. 4B. The system of the present invention may use existing UV/VIS spectrometers which may perform measurements at a high repetition rate, typically, in less than 5 milliseconds.

According to an embodiment of the invention, from the UV/VIS spectrum of the component's pads, the level of oxidation may be estimated. As a result, this measurement may be used for example, to correlate retaining of components and correlate to the physical "age" of the solder pads, to output the quality level of the pads in order to estimate its solderability. Any other use of the UV/VIS spectrum may be combined or integrated in systems according to the present invention. Similar concepts and methods may be used or processed using other systems or devices, e.g., using a camera image.

Electromagnetic radio-frequency (RF) measurements—System 100 may include electromagnetic RF measurements system as subsystem 108 to obtain features related to RF spectral absorbance and reflectance of an electronic component. RF waves penetrate the plastic component and in the wavelength band of ~500-3000 μm interacts with the metallic parts within the package. This spectral interaction is proportional to the metallic geometry within the package. The interaction may be for example, of antenna coupling of the conducting metal parts. Different size of lead frames, wire bonds or chips may result in different absorption spectra. The equipment which may be used for this application is a high frequency transmitter and receiver. For example, a frequency range of 100-500 GHz may be used for high frequency micro-antenna arrays and communications.

X-ray system—System 100 may include an X-ray system as subsystem 108 to image components. Embodiments of the invention may include systems which utilize high-energy electromagnetic radiation for scanning component reels and using their image to determine if a component is counterfeit, for example, by using X-ray imaging concept. The imaging system may be used to capture penetrating images of the components. The images are processed using image processing tools like a regular camera microscope.

It should be understood to a person skilled in the art that the list of sub-systems is an exemplary list and that system 100 may include any other sub-system, tool, instrument, device or means for obtaining one or more physical features of a detected component based on one or more measurements.

Reference is made back to FIG. 1. Subsystem 108 may obtain one or more features from a plurality of electronic components based on measurement detected by one or more probes 104 and 109. Data processing unit 107 may receive or collect the measurement output data from one or more sub-systems 108 included in system 100 which may implement one or more of the subsystems described above. Data processing unit 107 may compile and process the collected measurement output data. Data processing module 107 may use to train Machine Learning (ML) and Deep Learning algorithms. Measurements of the one or more sub-systems 108 may be first processed by each of the sub-systems 108 internal system. The output of each sub-system 108 may be selected to match a certain algorithm standard. Processing module or unit 107 may either process and train the data received from sub-systems 108 online or may upload the processed data to a cloud processing server. For example, control system 103 may decide if processing may be done locally on data processing unit 107 or on other server or data processing unit, e.g, on a cloud.

According to an embodiment of the present invention, data processing unit 107 may use one or more counterfeit detection algorithm. Each probe 104 may perform one or more measurements and several physical features may be extracted by automatic processing algorithms used by processing unit 107. The physical features obtained may be used to create a physical fingerprint or a unique model based on a large number of detected components of various types, manufacturers, categories and the like. Using the unique model system 100 may be capable of examining any detected component, determining if the detected electronic component is an authentic electronic component and allowing distinguishing between variations of components, e.g., between types, manufacturers, factories, designs, age and the like.

In some embodiments of the invention, Artificial Intelligence (AI) based algorithm may be used by processing unit 107 to compile the measured or obtained features from the in-line measurements tools, e.g., probe 104, into a unique model or a physical layered "fingerprint" which uniquely identifies and classifies the detected component and use them to classify the detected component in relation to a comprehensive components database. The unique model may be generated or created based on features and characteristics obtained from a large number of components of a plurality of types, styles, designs and produced by a plurality of manufacturers or factories. The unique model may be saved in a database which may be common to a plurality of users of a plurality of systems, e.g., system 100. Each use may update the database and improve the ability to classify detected components.

A database of components also referred herein as "components database" may be stored, kept or saved in a storage medium connected to, linked to or included in system 100. The components database may be obtained by using a network effect by sub-systems 108. Every user of system 100 may add more information to the database and may improve system 100 capabilities to detect more types of component with higher reliability. Therefore, the system may be assisted by exposure to scans to learn all the variant of the different components. System 100 may be taught to reorganize components as authentic if it learns their patterns and enters it to the system database.

Processing unit 107 may implement, process or use algorithms which learn how to detect counterfeit components or cyber components when taught on multiple authentic components and leaning on non-authentic ones. According to an embodiment of the invention, this may be achieved by combining layers of heuristic and partial machine learning algorithms as described in embodiments of the invention.

Turning now to the algorithm architecture, according to an embodiment of the present invention, a plurality of algorithms for automatic counterfeit detection based on inputs from the available sub-systems 108 may be used in accordance with embodiments of the present invention.

Processing unit 107 may include software application programming interface (API) which may receive data of the electronic components being examined by system 100 including their images and may process them in real-time. The implemented layered algorithm may search for traces of manipulations typical to re-programming malicious-cyber firmware or evidence of electrical interfacing through the component leads.

According to embodiments of the invention, one or more algorithms, used by processing unit 107, may employ deep learning algorithms to classify and to identify component type and class. It thus may return an answer with information about a detected component's authenticity and whether its cyber integrity is compromised. The algorithms may be used in one or more of the following processes: acquire image of a component, image standardization to improve the acquired image and fit the image to further processing, image sectioning to define sections of the image, image measurements, image classification, decision making regarding the component's authenticity, documentation and database updating, reporting and action being taken in relation to the decision. Algorithms related to image processing may use data received by subsystem 108 which include, for example, a computer vision system.

In some embodiments image standardization algorithms used by processing unit 107, may be used for cutting a size of an image, align the image, remove noise such as tape-related noise, adjust color, light and any other parameters of the acquired image. Image sectioning algorithms may be used for detecting and analyzing text, logos, leads, indentations and/or any other parameter. Image measurements algorithms may be used for measuring dimensions of the component, corner locations, colors of features in the component image and indentations in the component.

Image classification algorithms may be divided into a plurality of categories based on the available data they utilize. For example, in embodiments of the invention, image classification algorithms may be divided into two categories. A first class of algorithms may be used for analyzing a single image or features obtained from a single component. For example, features obtained by or output by a physical probe 104, e.g., a spectrometer or a measured set of features, e.g., dimensions, colors and the like, extracted from an image, e.g., a camera image, x-ray image or any other machine vision system. The features may be classified into a predetermined group or class. The predetermined class may be, for example, a component manufacturer, manufacturing date, solderability classes, quality classes, data quality or any other class or group. A second class may be used for analyzing a large number of images and features and relating to all the components, e.g., a plurality of images and features together as a group for detecting features related to a group of images such as, for example, similarity and tolerances.

According to embodiments of the invention, image classification algorithms may be divided to supervised and unsupervised algorithms. Supervised algorithms may include detection and analysis of information which may be provided with the component, e.g., information of a manufacture, date of manufacturing, expire date and locations related to the component while unsupervised algorithms may include analysis of information related to the component detection such as anomaly detection, tolerance analytics and class clustering. Supervised algorithms may analyze information on a single image, for example, features of the image e.g., logos, indentations and leads, measured/visual features, e.g., dimensions, colors, corners and information from labels and or logistical information such as serial numbers, data codes, batch numbers, part numbers and the like.

According to embodiments of the invention system 100 may be designed in performance tiers that may improve time and usage. For example, best performance may be attained when a tested component is already well known in the database with some instances of testing from different batches and production dates and there are also known cases of verified counterfeiting in the database. During the onset of the system the reliability level may be high due to algorithms that do not require specific prior knowledge from pre-measured similar components. System 100 may give high value even without prior knowledge in the database. A level of performance may be improved along time during usage as system 100 may save detection results and may use them in future use as being a learning system.

Embodiments of the invention may perform malicious hardware-cyber detection. For example, detecting of engineered hardware-cyber components. Attackers may engineer a component to pose as an innocent component, e.g., being similar to an original component. the counterfeit component may be designed to look and feel like an authentic component with embedded malicious hardware capabilities inserted during production. Embodiments of the invention may use component authentication algorithms to detect differences between the detected counterfeit component and an authentic component. The component authentication algorithms may determine that a component is different from an authentic component because they were produced in a different way, in different locations although were aimed to look identical. The algorithm may detect that a component is in-authentic as it was made by a manufacturing process which is different from an original manufacturing process which was used in manufacturing an authentic component.

Figure 11:
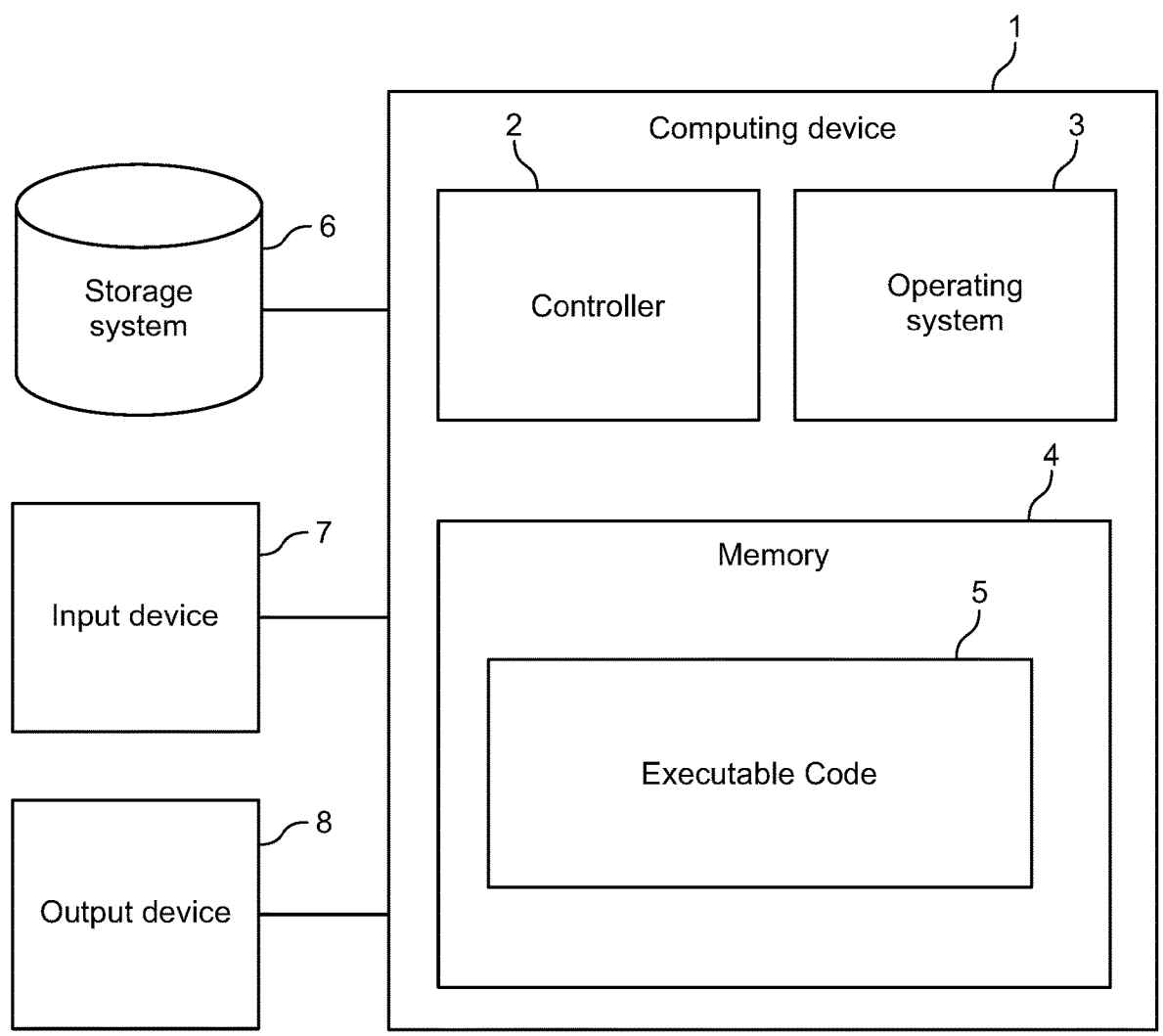
FIG. 11 is a block diagram depicting a computing device, which may be included within an embodiment of a system for detection of counterfeit and cyber electronic components according to some embodiments of the invention.

According to some embodiments, system 100 or any one of plurality of sub-systems 108, data processing unit 107 or control system 103 included in system 100 may be or may include at least one computing device, such as element 1 of FIG. 11. System 100 may include at least one non-transitory memory device (e.g., element 4 of FIG. 11) upon which computer-readable instruction code modules are stored (e.g., element 5 of FIG. 11), and at least one processor (e.g., element 2 of FIG. 11), associated with the non-transitory memory device, and configured to execute the stored instruction code modules, to implement the functionality of system 100, as described herein. It should be understood to a person skilled in the art that although only one measurement probe 104, 109 one sub-systems 108, one data processing unit 107 and one control system 103 are shown in FIG. 1, system 100 may include any number of inspection computers, sub-systems, data processing units and measurement probes according to embodiments of the invention.

Embodiments of the invention may provide a description of a suitable computing environment in which the invention may be implemented together with an algorithm architecture that may provide detection of counterfeit electronic components. While the invention will be described in the general context of program modules that execute in conjunction with an application program that runs on an operating system on a computer system, e.g., computing device 1 of FIG. 11, those skilled in the art will recognize that the invention may also be implemented in combination with other program modules and other hardware components, hardware modules, software modules and any other hardware based or software based sub-system.

Embodiments of the invention may detect components which may include or contain malicious firmware. Cyber-attacks can be performed by inserting malware-firmware into a programmable component. The altered firmware allows the attacker access to a system which includes such a malicious firmware. To facilitate such an attack, the attacker may need to unmount the component from its original package and to interface it with a programming probe in order to insert the malicious firmware. Authentic programmable components are traditionally programmed during the die manufacturing before packaging. As a result, typically, there are no interface signs on the component leads or in some cases a single mark on some pads for programming and testing. If a component was re-programmed in order to insert malicious firmware, the process of re-programming may leave traces, marks and indication of the additional programming, e.g., the interfacing probe may leave marks on the component external casing, e.g., on the leads or on balls of the component.

Figure 5A:
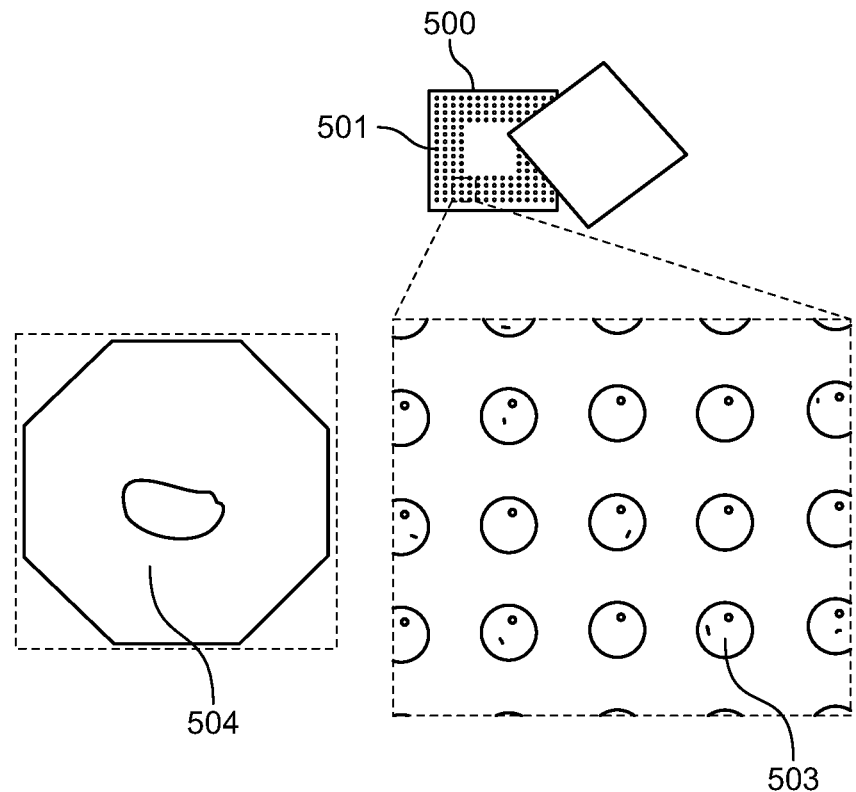
FIGS. 5A and 5B are pictorial illustration of traces on soldering leads and balls of an electrical component according to some embodiments of the invention.
Figure 5B:
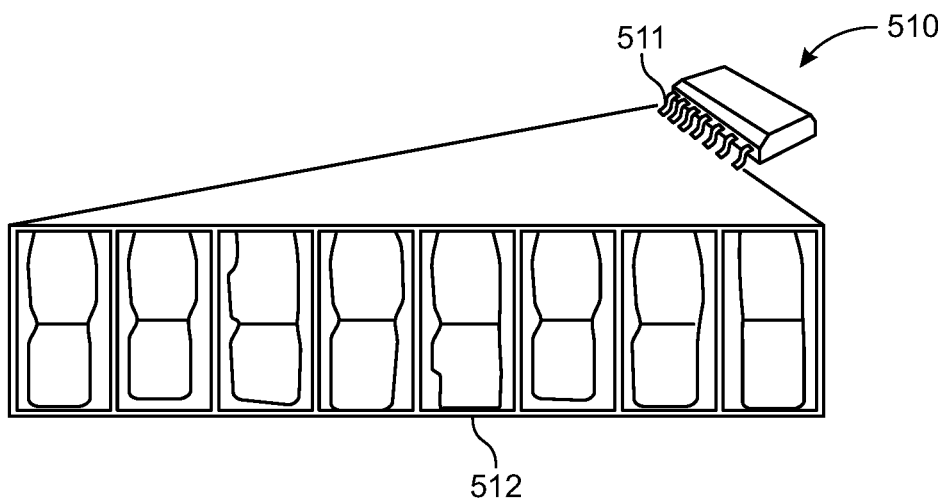

Reference is now made to FIGS. 5A and 5B, which are pictorial illustrations of traces on soldering leads and balls of an electrical component according to some embodiments of the invention. FIG. 5A shows a component 500 which may be any microprocessors, microcontrollers, field programmable gate arrays (FPGAs), programmable logic devices (PLDs) or application-specific integrated circuits (ASIC) may include one or more contacts between the component package and the internal circuit. The contacts may be implemented by, for example solder lead balls or bumps 501. In case component 500 is re-programmed by an attacker, soldering lead and/or balls 501 may show a mark or sign due to the additional programming made by a programming probe as shown by reference numbers 503 and 504.

FIG. 5B shows an electrical component 510 which may include a plurality of soldering leads 511 which are shown in enlarged view 512. In case component 510 is re-programmed by an attacker, one or more soldering lead 511 may show a mark or sign due to the additional programming In some embodiments of the invention, soldering-leads assessment algorithm may be used in order to test soldering leads condition, authenticity and solderability.

According to embodiments of the invention, solderability may be assessed by deep learning techniques on visual images of the component leads or balls. As the main cause of deterioration to the solderability of a joint is due to corrosion and intermetallic chemical reaction in the soldering leads and pads, embodiments of the invention may focus on the soldering leads and balls in the component side of the joint.

Each component may be usable for a certain period from manufacturing date, e.g., standard components may be usable within 18-36 months of manufacturing given they were stored according to the industry standard. During that time the deterioration of the leads may remain negligible and may not damage the solderability of a component. After that duration of time the leads corrosion and intermetallic degradation may become noticeable and may affect the quality of the joint and product. Soldering leads and balls, e.g., lead 511 and balls 501 may be made of unstable material that age. The surface of the leads is constantly growing an oxidation layer that affects the solderability to the worse, and the intermetallic reactions in the leads are progressing with time as well. The growing oxidation layer or metallic morphology has a different appearance and reflectivity that the layer, e.g., within the first 18-36 months of manufacturing. The appearance changes may be expressed by changing the roughness and the color of the leads. The change in color and roughness changes the way light is reflected from its surface.

Embodiments of the invention may classify the solderability of the leads by learning how the soldering pad of a solderable component reflects the light vs. how a poor-solderable component reflects the light. The light reflection analysis may be performed by analyzing the component image and/or analyzing a component reflectance spectrum in the UV/VIS band. In addition, a component date of manufacturing, or age, may be estimated based on the gradual degradation of the lead's reflectance. The model is taught or created by using multiple images, e.g., thousands of images of a component from a specific package type, made by the same manufacturer from different manufacturing dates. The model is trained for classifying the image to its manufacturing year. The analysis may be made on the leads or balls of the component. Components that appear to be older than a predetermined period of time may be suspected of poor solderability.

Embodiments of the invention may train the model based on multiple components that are known to be in good or poor solderability conditions of a specific manufacturer and component type. Obtaining the components may either be from known poor solderability and known fresh components taken from the industry or by accelerating the solder leads conditions using temperature and humidity and verifying their solderability state by sample physical lab testing. The uniformity of the solder leads conditions can be verified by the machine learning algorithms. The system, e.g., system 100 of FIG. 1 may use both methods and may balance between them therefore, the result of the model training may be for any classification, e g manufacturing years, solderability good/poor conditions and the uniformity of the solder leads condition in a package. The model may be obtained for all manufacturers and package types. Some generalization or aggregation of package type may be used in order to reduce the size of the database required. For example, the leads of all capacitor's packages may be similar and will not require separate models for some capacitor models, and for certain packages, e.g., the number of leads in a package may vary. Embodiments of the invention may evaluate the state of the components soldering pads, thereby enabling to detect pads reworking as an indication of counterfeiting and to evaluate the quality of the pads for solderability.

Some embodiments of the invention may use component authentication methods which may include big-data artificial intelligence (AI) classification algorithms. AI algorithms may compare component forensic fingerprint with a database of pre-scanned components. This utilizes both feature algorithm-based approach which may generate a model based on classification approach and/or based on a deep learning approach. The algorithm-based classification approach may search for direct measured values and may perform a parametric comparison between expected values and measured values. The deep learning approach may utilize raw image of a detected component or spectral analysis of the detected component or of an image of the component and may use deep machine learning processes.

This approach applies machine learning to create abstractions of each learned class and learns the distinguishing parameters within the measurement set. Both multi-class-supervised algorithms comparing the component to the components in central data-base and unsupervised single classifiers. The component image may be detected and cropped for processing using the machine learning (ML) algorithms. The algorithm-based approach may use measured tabled features like dimensions, colors, indentation dimensions and location, etc. from the image as features for the machine learning algorithm. This algorithm may also output physical parameters that may be used in the component validation in accordance with the component logistical information obtained from the component or from the reel sticker.

Figure 6:
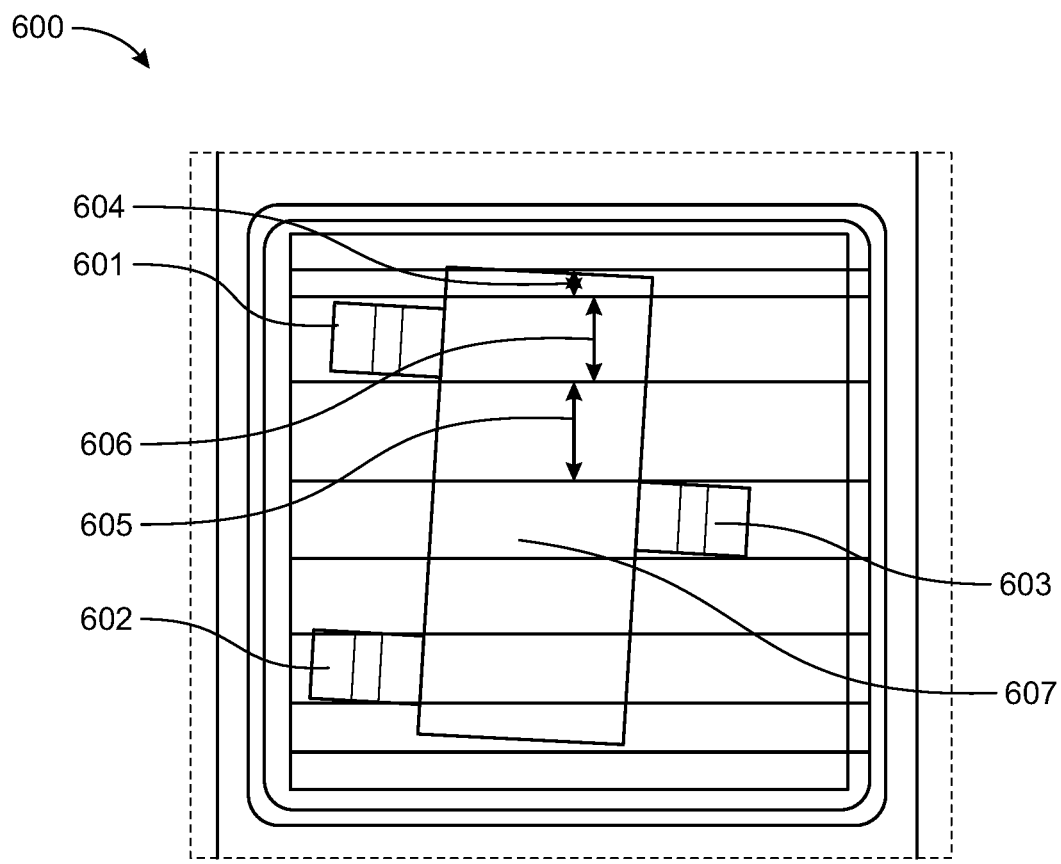
FIG. 6 is a pictorial illustration of detected features of an electrical component according to some embodiments of the invention.

Reference is made to FIG. 6, which is a pictorial illustration of detected features of an electrical component according to some embodiments of the invention. An image of a component 600 may be acquired by, for example, subsystem 108 of FIG. 1 and be analyzed by, for example, data processing unit 107 of FIG. 1. Image 600 may include an image of a component 607 having soldering leads 601, 602 and 603. Embodiments of the invention may use image 600 to measure a plurality of measurements, for example, a distance 604 from lead 601 to an end of component 607, pitch 605 and width 606 of lead 601. Other measurements and detected parameters may be obtained from image 600.

Embodiments of the invention may detect nonstandard component variations and counterfeiting evidence by utilizing anomaly detection algorithms. Anomaly detection algorithms may detect anomalies of component that may not be attributed to assigned to a specific predetermined class. Anomaly detection algorithm or technique may be used when a component does not match any predetermined class. For example, if a component is damaged, the damage may occur at different aspects or features in the component which cannot be predetermined In this case, a traditional classifier may not be able to classify him to a known group or class. In accordance with embodiments of the invention, anomaly detection may be implemented by using a classification model for the specific component package and detecting that features of a component are not within an acceptable range of the predetermined classes. A detected component which may be outside a range defined as a class may be identified as an anomaly and may be flagged as such.

Figure 7:
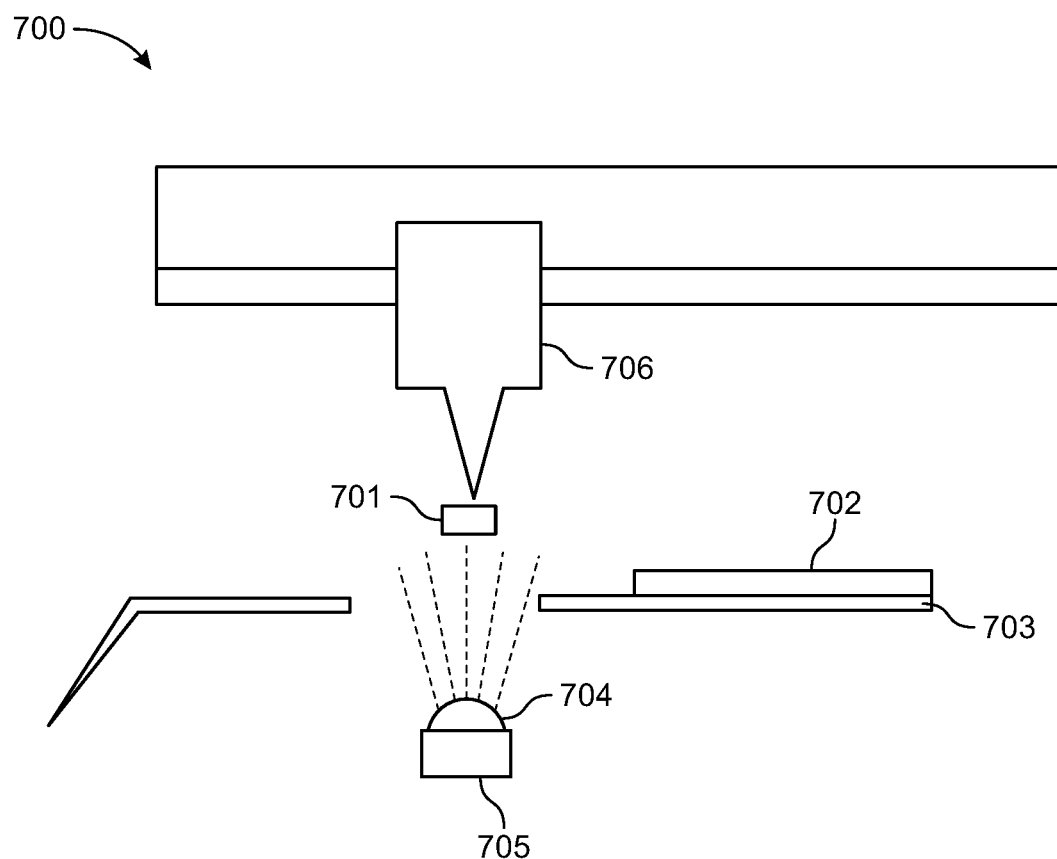
FIG. 7 is a schematic illustration of an exemplary system for detection of counterfeit and cyber electronic components within a pick-and-place system according to some embodiments of the invention.

Reference is now made to FIG. 7, which is a schematic illustration of an exemplary system for detection of counterfeit and cyber electronic components within a pick-and-place system according to some embodiments of the invention. The method and the system for detection of counterfeit and cyber electronic components which is presented in accordance with embodiments of the invention may, e.g., system 100 of FIG. 1 may be used or utilized by, embedded in and/or operated by any other system or machine, for example, reel-to-reel inspection machine, a SMT pick-and-place machine, an X-ray inspection machine or any other system or method that allows high throughput while tracking every individual component features. For example, a SMT pick-and-place machine 700 may include a head element 706 to place a component 701 on a printed circuit board (PCB) 702 located on a place station 703. Features of component 701 may be obtained or extracted by camera 704 connected to computer system 705. The component 701 may be probed while automatically being conveyed and used by system 700. Component 701 may be detected according to embodiments of the invention and one or more features from a plurality of components 710 may be obtained, e.g., by camera 704. Computer system 705 may process the one or more features to create a unique model related to component. In some embodiments the unique model may be created by an external computer system. The unique model may be used to determining if the detected electronic component is an authentic component.

Figure 8:
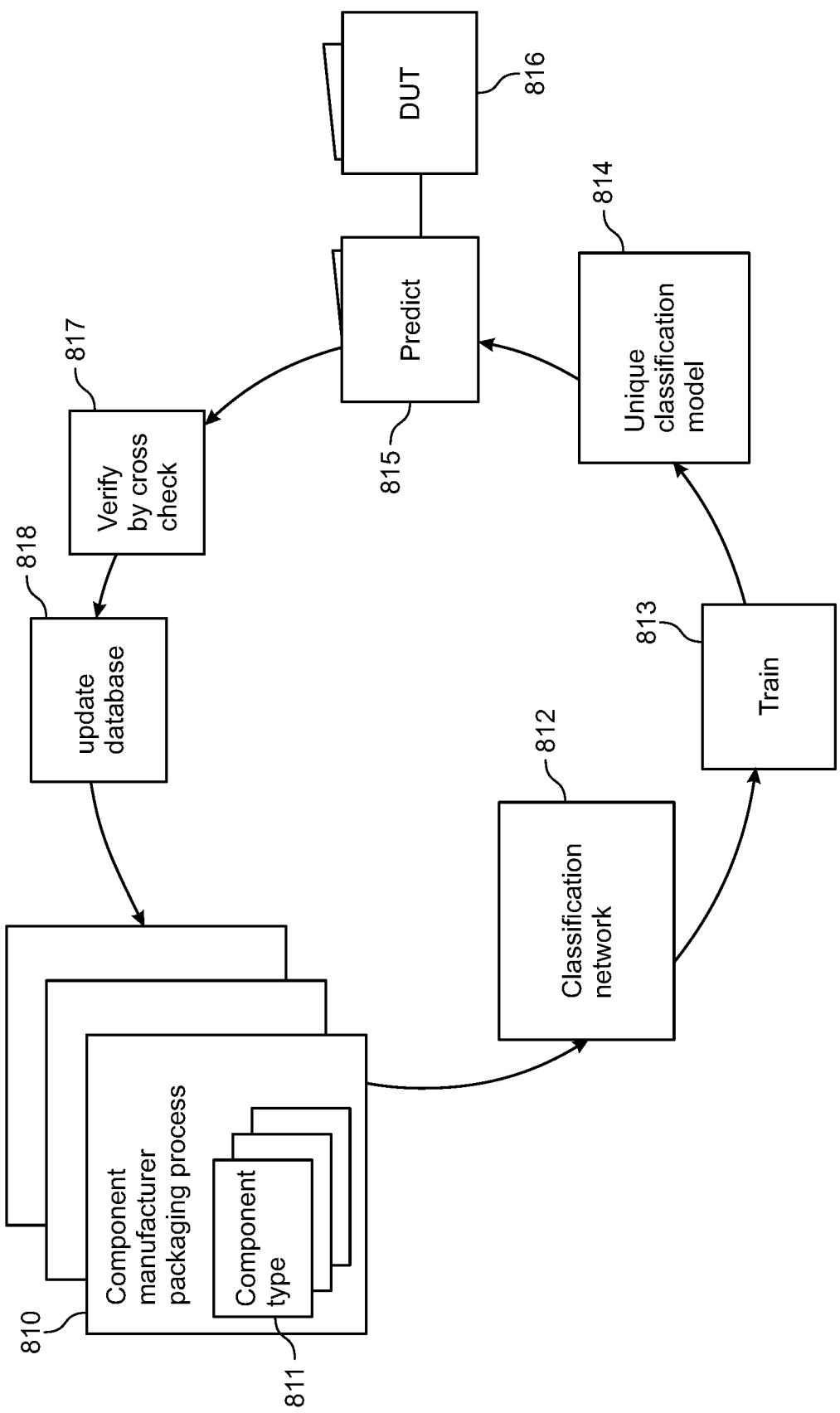
FIG. 8 is a schematic illustration of a flow chart for detection of counterfeit and cyber electronic components according to some embodiments of the invention.

Reference is now made to FIG. 8, which is a schematic illustration of a flow chart for detection of counterfeit and cyber electronic components according to some embodiments of the invention. A plurality of manufacturers or factories may manufacture a variety of components. Each of the manufacturers may use a component packaging machine and process 810 which may manufacture or produce one or more categories, class, groups or types of components 811. A plurality of components types from a plurality of manufacturers may be detected, examined and processed, e.g., hundreds, thousands or millions of components. One or more features may be obtained for a plurality of electronic components from each type, class, model or kind.

Classification network 812 may be used to process and learn the features from many data measurements in order to create or reach a unique classification model 814 by using a training process 813. The unique classification model may be related to electronic component of a certain type, class, model or kind or model and may be generated by using machine learning algorithms which may compile the obtained features to a robust "fingerprint" or a unique model that represents, characterize and identifies the specific type of components. Significant features may allow distinguishing to relevant classes or types and the unique model may be processed by learning the features from many data measurements and obtaining one or more classification models. Although not shown in FIG. 8, it should be clear that a unique model or classification model may be created or generated for each type, class, model, category or kind of component.

The relevant types or classes may, for example, be the original manufacturer of the component, the time of manufacturing, the quality of the components and the like. The unique classification model 814 may be used in order to determine if a device under test (DUT) 816, e.g., a detected electronic component is an authentic electronic component and identify if the detected component is from a known type or class. DUT 816 may be examined in order to obtain one or more features of DUT 816 and the one or more features may be used to predict 815 by the unique classification model to which class or type DUT 816 relate and whether it is authentic component. The prediction may be followed by verifying process 817 that the determination or decision made by prediction process 815 may be valid by cross reference to other algorithms that are executed on DUT 816. The result of the detection of DUT 816 may be logged and saved in a shared component database, as indicted at box 818.

According to an embodiment of the invention, each use of the system, e.g., system 1 of FIG. 1, to detect counterfeit components may add more information to the comprehensive components database, which accordingly may improve the system capabilities to detect more types of components with higher reliability. Therefore, exposure to the open market may enable the system to better learn the variant of the different components. System 100 may teach to reorganize components as authentic after it may learn its unique patterns, forms, indentations, marking, impurities, designs and layouts and enters them to a database of the system, as described in embodiments of the present application. The unique patterns are abstracted by the algorithm to a feature classification model.

According to an embodiment of the present invention, a database may be obtained based on previously authenticated components. The features database may be based on large enough volume of authentic components as to automatically learn the natural variance and tolerance of all the measured features of the detected components. According to embodiments of the invention, continuous collection of data from all the systems available may improve the sophistication and maturity of the machine learning classification algorithms. Data measured in different locations may aggregated and analyzed to obtain deeper understanding of the distribution of component properties, statistical features and acceptable tolerances. A "big data" algorithm may be used to collect, sort and analyses any new data acquired and to compare its validity to the component database and to evaluate how the additional data may be introduced into the current operating models.

As there are over tens of millions of components types in the market. It may be difficult to develop a comprehensive database and to construct a classifier for that many classes. For example, to create a robust machine learning classification algorithm one typically requires more than ten thousand components for each of the training classes. Therefore, creating a model for ten million components would require measurements for over hundred billion components. In addition, a machine learning classifier operating on such a large database may be extremely large. A large model may require a lot of computing resources and time.

Embodiments of the invention may allow to significantly reduce the classification models and its required database size. A classification model may be based on the forensic "fingerprint" or identification of the machine that packages the component. Embodiments of the invention may classify the package and the molding characteristics and not the component itself in order to reduce the number of classes, e.g., from tens of millions to a few thousand only.

For example, a capacitor manufacturer manufactures hundreds of types of capacitors that may vary in their capacitance, operating voltage, operating accuracy or any other parameter, all may be packaged in the same package type which may be packaged by the same machine. Classifying a machine that packaged it rather than the component types, may reduce the number of classes to train and keep in the database less items, e.g., instead of hundreds of components classes only one machine.

According to some embodiments of the invention, an item that may be kept in the classification models is not the components type but the forensic features that the machine that cast or assembled may left on the component. Machine learning forensic analysis may allow to find distinguishing features that are common for all the components packaged by the same machine and may be different between packaging machines. This may be also valid for the same packaging machine models deployed for different products at different manufacturing sites. The component final shaping by casting, imprinting, stamping, cutting and the like may include distinguishable features it imprints on the component they are packing.

In some cases, pre-authentication may be performed in-situ by comparing the features or "fingerprints" within a reel or a package. In some embodiments an authentication algorithm may use to grade the quality of the fingerprint according to the level of the reliability which may be based on one or more of the following features the method a fingerprint was obtained by, e.g., a direct detection and/or variation within a reel, the number of components measured, the equipment used and the authentication equipment location, e.g., distributer/components manufacturer/EMS/brand.

Figure 9:
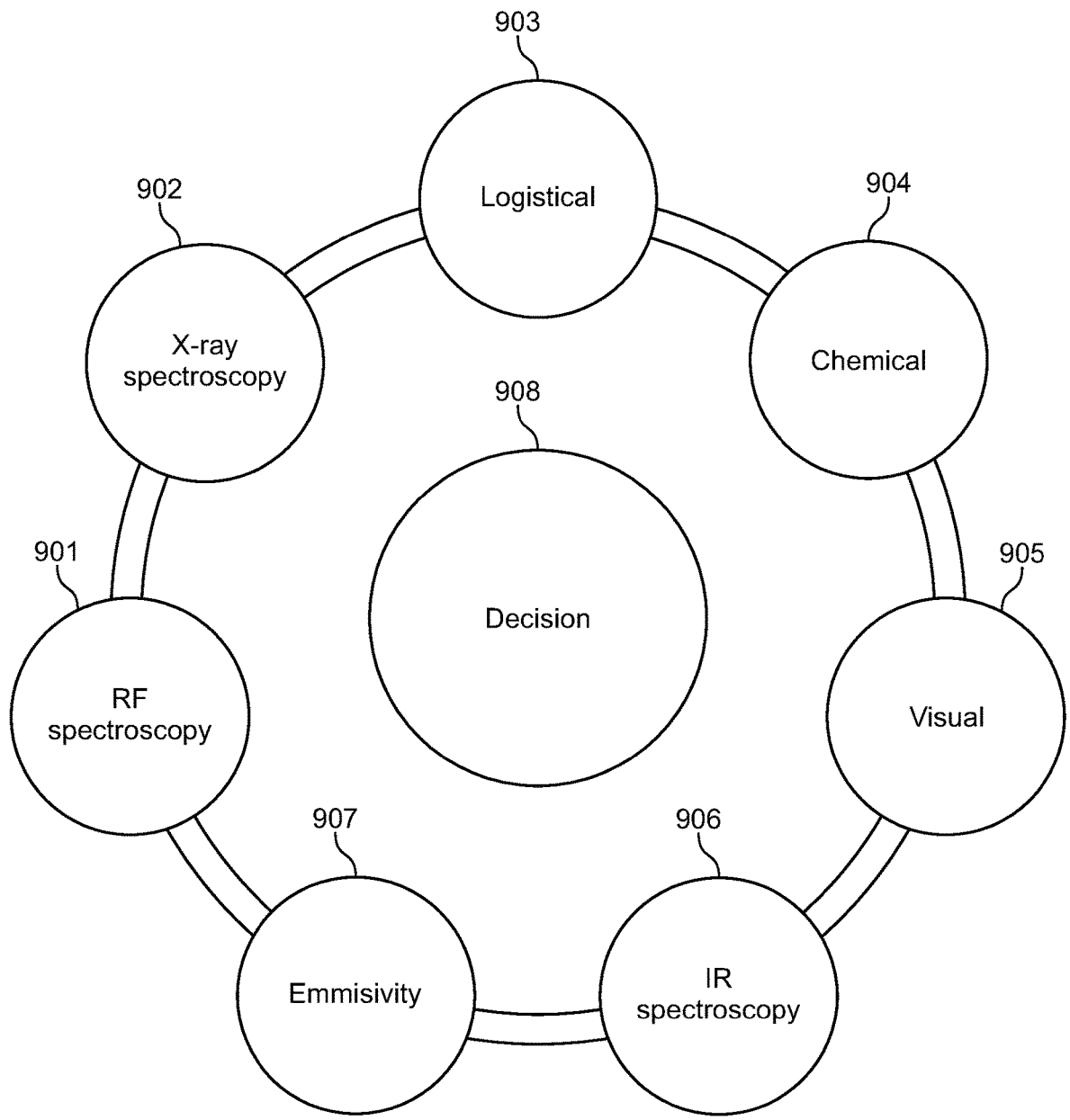
FIG. 9 schematically illustrates a top-level decision-making algorithm, according to some embodiments of the invention.

Reference is now made to FIG. 9 which schematically illustrates a top-level decision-making algorithm, according to some embodiments of the invention. Top-level decision-making algorithm 900 may include one or more of sub algorithms 901-907. For example, RF spectroscopy algorithm 901, X-ray spectroscopy algorithm 902, logistical algorithm 903, chemical algorithm 904, visual algorithm 905, IR spectroscopy algorithm 906 and emissivity algorithm 907. Any other algorithm may be used alone or in combination with algorithms 901-907 in accordance with embodiments of the invention.

Algorithms 901-907 may be implemented, process and run by one or more sub-systems 108 of FIG. 1, by one or more data processing units 107 of FIG. 1 and/or by steps of FIG. 8. According to embodiments of the invention, all the available outputs of the sub-algorithms 901-907 may be compiled by the top-level decision-making algorithm 908 to decide if a tested component is authentic or not. The decision-making algorithm 908 may function on partial data and its accuracy is proportional to the amount and quality of the measurements compiled. The algorithm 900 may operate in several metrics and classification methods using Machine-Learning and Deep-Learning to make the decision.

For example, embodiments of the invention may use computer vision algorithm, e.g., visual algorithm 905. The computer vision algorithm is comprised of two sections, each section may receive as input an image of the component captured by an optical or digital imager, e.g., a camera. The algorithm may be comprised of two main segments: image processing and features processing. The image processing algorithm may utilize an image or parts of an image. The image processing algorithm may extract features and apply segmentation, e.g., by using Convolutional Neural Networks (CNN) and computer-vision methods for individual processing in the feature extraction phase, where the computer-vision algorithm operates on the text output of the automatic computer vision system.

The feature extraction phase may be applied on parts or components of the image that were detected using the computer-vision system and singles them out for individual processing. In the second segment, during the feature processing, each component is processed by CNN and other methods for extracting features for a classification task. For example, in cases where soldering pads of the detected component are visible in the image an automatic computer-vision algorithm may identify them and methodically cuts them out of the image for separate processing. These "cut-outs squares" of leads are used in a separate classifier which is an algorithm that classifies the segmented image to pre-determined classes to determine of their features resemble the expected components or that they have been changed. The output of this classifier may be used in conjunction with the emissivity measurement output, e.g., emissivity algorithm 907, to determine the quality of the soldering pad and to evaluate if the age of the component matches the age of the soldering pad. If there is a miss-match it could mean the solder pads have been refreshed or improperly stored.

Embodiments of the invention may use IR spectroscopy algorithms, e.g., IR spectroscopy algorithm 906. IR spectroscopy output may provide a table of IR light reflected at all the measurement wavelengths. The peaks in the measurements represent light absorption by modes of molecular vibrations. Some regions in the spectrum may characterize the types of the bonds and the atoms participating. Another region in the spectrum is more complex and is referred to as the "fingerprint" region as the chemical aspects in this region are more difficult to extract, however, it is unique for each material and therefore may serve as a unique "fingerprint" or model. The IR spectroscopy may be used to characterize the material of which the detected component is made of and obtain a unique fingerprint of the detected component. The measured data may be normalized and filtered and then compiled into a features list. This features list is assigned to the component type. Learning multiple identical components using neural networks distills the features of the components and is used to classify them. The classification can be made between different types of components or anomaly detection.

The spectra can be trained for age classification by using the logistical module age output as a training set point for the component spectra. The output of this classification is normalized component age based on the surface chemical spectra.

According to an embodiment of the invention, emissivity algorithm, e.g., emissivity algorithm 907 may be used. A measurement may be performed by shining light on a detected sample or component with a selected wavelength band, e.g., a wavelength band between of 200 nanometers (nm) and 1000 nm. A selected wavelength band may be selected such as to be smaller than roughness grooves in the surface of the detected component. The reflected light may be picked-up and analyzed by using a spectrometer that evaluates the reflectance in each wavelength and plots a spectrum. The measured spectrum is a super-position of the entire measured surface where the light shone.

The measured data may be normalized and filtered and then compiled into a feature list. The feature list may comprise a list of measured values at predetermines specific wavelength bands. The features list may be assigned to the component type. Learning multiple identical components using neural networks distills the features of the components and is used to classify them. The classification may be used to classify the measured component to predetermined list of component classes that may be either manufacturer and manufacturing date or to different quality level classes of similar distinguishing classes made between different types of components or anomaly detection which is detecting anomalies in the measurement in comparison to other similar measurements or to a pre-learned structure.

According to embodiments of the invention the spectra detected may be trained for age classification by using the logistical module age output as a training set point for the component spectra. The output of this classification is normalized component age based on the surface spectra. The algorithm is identical to the chemical spectroscopy algorithm although it utilized different measurement band.

According to embodiments of the invention electromagnetic radio frequency (RF) algorithms may be used, e.g., RF spectroscopy algorithm 901. Basing on the assumption that the RF spectral interaction is proportional to the metallic geometry within a package of s detected component, different size of lead frames, wire bonds, chips or other elements of the component may result in different absorption spectra. The input of the RF algorithm module is a spectrum, which is conceptually identical to IR or UV/VIS spectroscopies. The output in this case encompasses fingerprint of the small metallic parts in the component like lead frames, metallization on the die, bonds and/or any other metallic parts in the detected component. Electromagnetic RF algorithms may be most effective for detecting fakes and cyber hardware components. An Artificial Intelligence (AI) algorithm may be used to compile output of an electromagnetic RF measurement module to a features list. The algorithm is trained using multiple component features list to learn the natural and accepted variations within a reel. Every new component can be classified accordingly.

According to embodiments of the invention X radiation (X-ray) spectral algorithms may be used, e.g., X-ray spectroscopy algorithm 902. An X-ray sub-system may produce an X-ray image. The X-ray image is aimed to obtain features related to X-ray absorbance and reflectance of metallic parts within the package of the component. X-rays penetrate the plastic component and interacts with the metallic parts within the package. According to an embodiment of the invention, as this spectral interaction is proportional to the metallic geometry within the package, this is an image measurement like the vision system and is treated using the same type of algorithm.

According to an embodiment of the invention, in addition to the authentication top-level decision algorithm 908, the algorithm may compiles the quality related outputs like consistency of parameters within a component for example, the pitch between soldering leads, the roundness of corners, accuracy, cracks and voids, clarity of text and the like to a quality index or a quality classification which may determine whether a component can be used in production. The quality index may compile the algorithms output for authentic components and may classify components with different types of faults. For example, cracks, voids, missing legs, tampering, corrosion, solderability issues, age, etc.

According to embodiments of the invention, the system, e.g., system 100 of FIG. 1 may comprises a browser or any application module with a user interface at a test facility connected to a local front-end server that performs the probes measurement acquiring, pre-processing and fingerprint compilation. The front-end server may communicate through a web-API gateway that governs external communication policy. In locations where internet connectivity is possible, the front-end server may handle that communication traffic. In cases where no external communication is possible, the front-end server may manage off-line one-direction loading of fingerprint database.

In some embodiments of the invention, in order to perform effective components screening which is approving a component for assembly or disqualifying it, the system may have access to the inspected features fingerprint and models from the database. The database may be obtained either by on-line connectivity to a database outside of the facility or inserted securely locally. Acceptance to use the data statistically by the site will enable high level information that may be utilized to improve the reliability of the system.

A global database of components fingerprint may collect all complied signatures from deployed system with connectivity. The gathered information may then be further compiled to obtain a higher-level processing of the global information allowing one or more of the following features: Measuring trends within authentic components; detecting natural variation in components features production, tracking ageing parameters of components, processing logistical traffic of components, internal list and weights for unsecured distributers and components and internal weights for reliability of sites. According to embodiments of the invention, the system transactions may be kept at a confidentiality and security manner in order to protect user's privacy. The components database may be tightly secured and deployed according to the local needs only.

As will be appreciated by the skilled person the arrangement described in the figures and in the detailed description may result in an automated system for mass authentication of up to 100% of articles such as electronic components. The components may be tested inside their package, with or without discharging and the authentication is non-destructive. Moreover, the authentication may take place while inside different components shipment and handling package types like reels at different dimensions and pitch, stick magazines and trays as described in embodiments of the invention.

Figure 10:
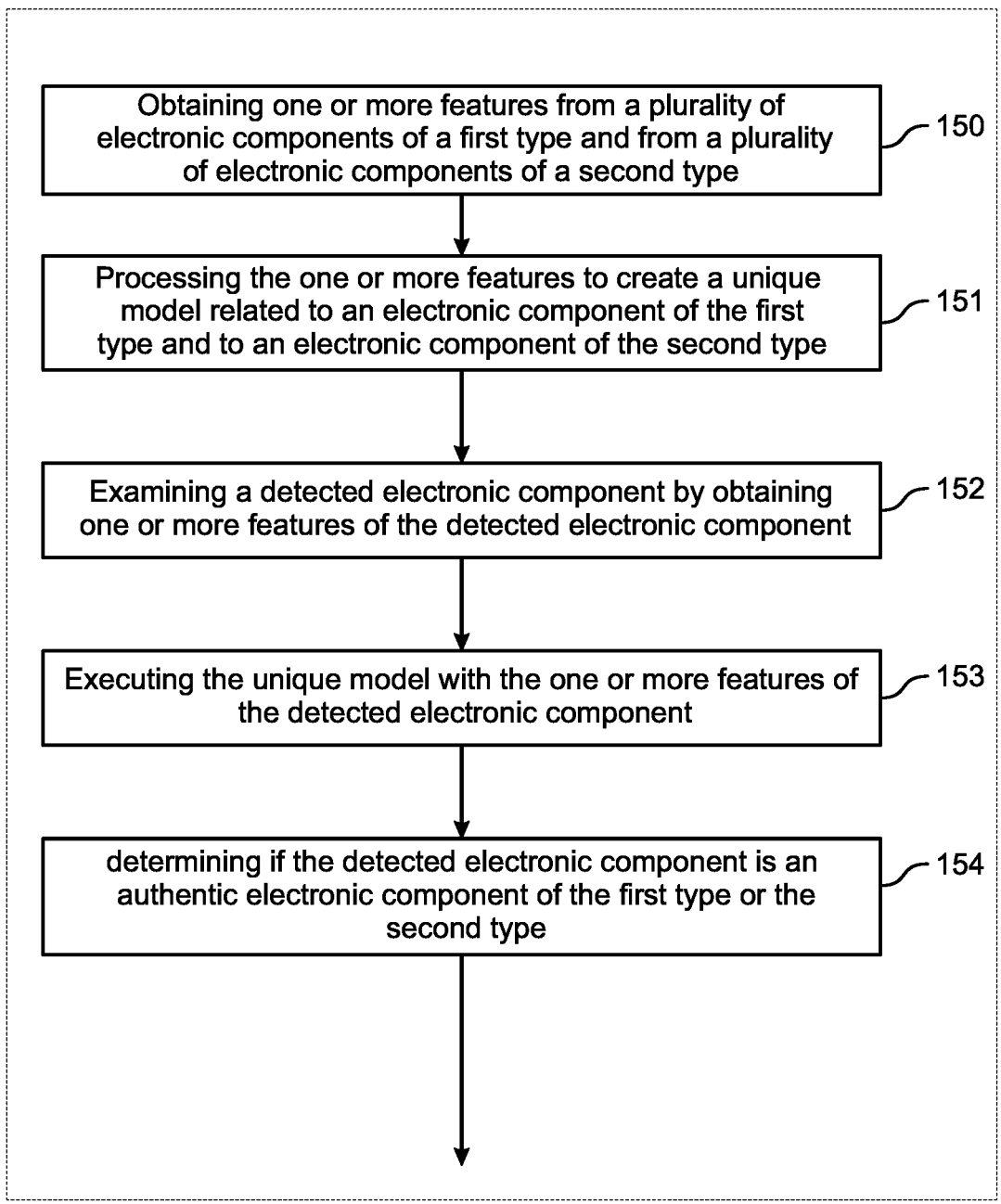
FIG. 10 is a flowchart of a method for detection of counterfeit and cyber electronic components according to some embodiments of the invention.

FIG. 10 is a flowchart of a method for detection of counterfeit and cyber electronic components according to some embodiments of the invention.

As indicated at box 150, an embodiment may include obtaining one or more features from a plurality of electronic components of a first type and from a plurality of electronic components of a second type, e.g., by measurement probe 104 and/or sub system 108 of FIG. 1.

As indicated at box 151, an embodiment may include processing, e.g., by processing unit 107 of FIG. 1, the one or more features to create a unique model related to an electronic component of the first type and to an electronic component of the second type.

As indicated at box 152, an embodiment may include examining a detected electronic component by obtaining one or more features of the detected electronic component, e.g., e.g., by measurement probe 104 and/or sub system 108 of FIG. 1. As indicated at box 153, an embodiment may include executing the unique model with the one or more features of the detected electronic component, e.g., by processing unit 107 of FIG. 1. As indicated at box 154, an embodiment may include determining if the detected electronic component is an authentic electronic component of the first type or the second type.

It should be understood to a person skilled in the art that other operations or sets of operations may be used in accordance with embodiments of the invention.

Reference is now made to FIG. 11, which is a block diagram depicting a computing device, which may be included within an embodiment of a system for detection of counterfeit and cyber electronic components, according to some embodiments of the invention.

Computing device 1 may include a controller 2 that may be, for example, a central processing unit (CPU) processor, a chip or any suitable computing or computing device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may allow automatically connecting in a wireless network as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors, controllers (e.g., controllers similar to controller 2), microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, a smart phone, a tablet device or any other suitable computing device. Where applicable, modules or units described herein, may be similar to, or may include components of, device 1 described herein.

Unless otherwise indicated, the functions described hereinabove may be performed by executable code and instructions stored in computer readable medium and running on one or more processor-based systems. However, state machines, and/or hardwired electronic circuits can also be utilized. Further, with respect to the example processes described hereinabove, not all the process states need to be reached, nor do the states have to be performed in the illustrated order. Further, certain process states that are illustrated as being serially performed can be performed in parallel. Moreover, those skilled in the art will appreciate that the invention may be practiced with other computer system configurations, including multiprocessor systems, microprocessor-based electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The terms, "for example", "e.g.", "optionally", as used herein, are intended to be used to introduce non-limiting examples. While certain references are made to certain example system components or algorithms, other components and algorithms can be used as well and/or the example components can be combined into fewer components and/or divided into further components.

All the above description and examples have been given for the purpose of illustration and are not intended to limit the invention in any way. Many different measurement probes, methods of analysis, electronic and logical elements can be employed, all without exceeding the scope of the invention.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for detection of counterfeit and cyber electronic components, comprising:
   obtaining one or more features from a plurality of electronic components of a first type and from a plurality of electronic components of a second type:
   processing the one or more features to create a unique model related to an electronic component of the first type and to an electronic component of the second type;
   examining a detected electronic component by obtaining one or more features of the detected electronic component;
   executing the unique model with the one or more features of the detected electronic component;
   determining if the detected electronic component is an authentic electronic component of the first type or the second type; and
   compiling quality related features of the one or more features of the detected electronic component to a quality index determining whether the electronic component is acceptable for use in production, wherein the quality index compiles the output of the unique model for authentic components and classifies components with different types of faults.

2. The method according to claim 1, wherein the one or more features of the plurality of electronic components and the one or more features of the detected electronic component are one or more physical features.

3. The method according to claim 1 wherein obtaining the one or more features of the plurality of electronic components and the one or more features of the detected electronic component comprises collecting one or more measurements by one or more measurement probes.

4. The method according to claim 1, wherein processing the one or more features of the plurality of electronic components and the one or more features of the detected electronic component comprises running one or more algorithms on the one or more features.

5. The method according to claim 2, wherein processing the one or more physical features from the plurality of electronic components comprises training the unique model by running one or more Machine Learning algorithms and Deep Learning algorithms.

6. The method according to claim 1, wherein the one or more features of the plurality of electronic components and the one or more features of the detected electronic component are obtained while the electronic components are automatically conveyed in a manner that allows high throughput while tracking every feature of the one or more features of the plurality of electronic components and the detected electronic component by one or more measurement probes.

7. The method according to claim 1, wherein the one or more features of the plurality of electronic components and the one or more features of detected electronic component are obtained by one or more systems from a group consisting of: a computer vision system, an Infra-Red UR) Spectroscopy system, an emissivity measurement system, an electromagnetic Radio Frequency (RF) system, a X-ray measurement system.

8. The method according to claim 1, wherein the one or more features of the plurality of electronic components and the one or more features of detected electronic component are obtained by respectively capturing one or more images of the plurality of electronic components and one or more images of the detected electronic component.

9. The method according to claim 8 wherein the one or more images comprises logistical information.

10. The method according to claim 8, further comprising automatically removing a cover tape that covers the plurality of electronic components and the detected electronic component, prior to capturing the one or more images.

11. The method according to claim 1 wherein obtaining one or more features comprises one or more of the following measurements: infrared spectrum of absorption or emission materials, emissivity measurement, electromagnetic Radio Frequency (RF) measurement, and X-ray measurement.

12. The method according to claim 8, further comprises detecting one or more faults of the detected electronic component wherein the faults are selected from the a group consisting of: cracks, voids, missing legs, tampering, corrosion and solderability issues.

13. The method according to claim 1, further comprising evaluating the state of the detected electronic component's soldering pads, thereby enabling to detect reworking of a soldering pad of the detected electronic component as an indication of counterfeiting and to evaluate the quality of the pad for solderability.

14. The method according to claim 1 wherein the one or more features of the plurality of electronic components and the one or more features of the detected electronic component are related to a process of component packaging of the plurality of electronic components of the first type and to a process of component packaging of the plurality of electronic components of the second type, to reduce a number of detected electronic components.

15. A system for detection of counterfeit and cyber electronic components, comprising:
   a computer vision system for obtaining an image of one or more features from a plurality of electronic components of a first type and from a plurality of electronic components of a second type; and
   a processor configured to:
      process the image of the one or more features to create a unique model related to an electronic component of the first type and to an electronic component of the second type;
      execute the unique model with an image of one or more features obtained by the imaging system from a detected electronic component;
      determine if the detected electronic component is an authentic electronic component of the first type or the second type; and
      compile quality related features of the one or more features of the detected electronic component to a quality index determining whether the electronic component is acceptable for use in production, wherein the quality index compiles the output of the unique model for authentic components and classifies components with different types of faults.

16. The system according to claim 15, wherein the processor is further configured to train one or more Machine Learning algorithms and Deep Learning algorithms.

17. The system according to claim 16, wherein the processor is to process and train the data online or upload the processed data to a cloud processing server.

18. The system according to claim 15, further comprising a conveyor to that conveys the electronic components in their original package for their measurements by the computer vision system.

19. A system for detection of counterfeit and cyber electronic components, the system comprising:
   a computer vision system for obtaining an image of one or more features from a plurality of electronic components;
   at least one processor operable to execute executable instructions to process the one or more features obtained from a detected electronic component and perform the method of claim 1.

* * * * *